United States Patent Office 2,697,076
Patented Dec. 14, 1954

2,697,076

MAGNESIUM-TITANO-SILICATE PHOSPHOR

James Thomson Anderson and Robert Stirling Wells, Rugby, England, assignors to General Electric Company, a corporation of New York No Drawing. Application January 30, 1952, Serial No. 269,117

Claims priority, application Great Britain March 6, 1951

7 Claims. (Cl. 252—301.4)

This invention relates to a luminescent material giving a luminescence covering a wide band of radiation mainly in the visible region of the spectrum, when excited by short-wave radiation such as is produced by the low pressure mercury vapor arc and cathode rays. The present application is a continuation-in-part of our application Serial No. 261,928, filed December 15, 1951, now abandoned.

A luminescent material, according to the invention, comprises a fired reaction product of oxides of magnesium, silicon and titanium, magnesium fluoride, with or without one or more additional activators.

We are aware that there have been disclosed hitherto luminescent materials comprising magnesium silicate activated with manganese, responsive to cathode rays and giving a red luminescence, magnesium titanate activated with manganese, responding with a red luminescence, to long ultraviolet radiation and weakly to short-wave ultraviolet radiation, and magnesium-titano-silicate responding with a substantially blue luminescence to cathode rays. The luminescent materials of the present invention are distinct in their constitution and properties from these known materials, notably in that they are strongly responsive to short-wave ultraviolet radiation with a luminescence which gives an over-all impression of greenish-yellowness to the eye.

The material can be conveniently prepared by heating together MgO, $SiO_2$, $TiO_2$, $MgF_2$ in silica crucibles in an oxidizing atmosphere, e. g., air, at a temperature of from 1000° C. to 1250° C., preferably between 1150° C. and 1200° C. for periods of one-half hour or so dependent on the quantity fired, until maximum luminescence is attained.

The raw materials used should be of at least A. R. (Analytical Reagent) purity, and the $SiO_2$ should be of a highly reactive type, and its moisture content should be allowed for, when it is used.

The $MgF_2$ can be prepared by the reaction of a soluble fluoride with a soluble magnesium salt, followed by washing and drying.

The ratio of MgO to $SiO_2+TiO_2$ can be between 4:1 and 1:2 in molecules.

The molecular ratio of $TiO_2$ to $SiO_2$ may be between 1:200 and 1:1, and the molecular ratio of MgO to $MgF_2$ between 10:1 and 1:2. That is not to say that good results will be obtained if extreme amounts of all the ingredients are used simultaneously.

The following is an example of the preparation of a luminescent compound according to the invention:
Intimately mix together the following ingredients:

43.0 gms. of MgO
5.0 gms. of $TiO_2$
33.8 gms. of $SiO_2$ (containing 14% moisture)
10.0 gms. of $MgF_2$.

Fire in a silica crucible at 1180° C. for one hour. Powder and repeat firings until maximum brilliance is attained; one or two further firings should be sufficient.

We have discovered that although the material when prepared with the purest raw materials available does not require any further addition as an activator to render it capable of fluorescent response to short ultraviolet radiation and cathode rays, certain substances are capable of enhancing or altering the luminescence. Those preferred are Hg, Mn, Sb, Sn, Te, and Tl which should be used in the form of a compound which will break down under the influence of heat in the presence of the other ingredients into such a state as to allow its incorporation in, or influence on, the crystal matrix of the phosphor. Suitable compounds are, for instance, nitrates, acetates, formates, etc., or the oxide of the element.

The advantageous range over which these additions or secondary activators may be used is approximately from 0.05% to 6% of the added compound, by weight, of the other raw materials.

There is no true lower limit which can be determined since the material is luminescent without any of these additions, and similarly since most of the oxides of the elements mentioned are volatile at the firing temperatures used, the top limit is uncertain because prolonged firing leads to the loss of an indefinite amount of the element. The useful limit of the 6% mentioned above may be exceeded in some cases, if desired.

The following is an example of the preparation of a luminescent compound of this invention containing mercury as the addition.
Intimately mix together:

43.0 gms. of MgO
10.0 gms. of $TiO_2$
30.0 gms. of $SiO_2$ (containing 14% moisture)
10.0 gms. of $MgF_2$
4.5 gms. of $HgNO_3.H_2O$ Fire in a covered silica crucible in air for two hours at 1060° C., followed by grinding and refiring for periods of 1½ hours at 1180° C. ±20° C. until maximum luminescence is attained. About six such firings may be necessary.

The material so prepared shows a greenish-yellow luminescence with short ultraviolet irradiation, is unresponsive to long ultraviolet radiation, and gives a green-yellow-white response to cathode rays.

The following is an example of the preparation of a luminescent compound utilizing manganese as the secondary activator.
Intimately mix together:

34.5 gms. of MgO
20.0 gms. of $TiO_2$
30.0 gms. of $SiO_2$ (containing 14% moisture)
10.0 gms. of $MgF_2$
1.5 gms. of $Mn(NO_3)_2.6H_2O$.

Fire in a silica crucible at 1180° C. for one hour. Powder and repeat firings until maximum brilliance is attained; one or two further firings should be sufficient.

Certain additions influence the color of the luminescence with cathode rays, e. g., PbO, and $Bi_2O_3$ shift the luminescent color slightly toward the blue, and $Mn(NO_3)_2$ sends it toward the red. Other additions influence the brilliance of luminescence and the phosphorescence, which is pronounced with cathode rays.

What we claim as new and desire to secure by Letters Patent of the United States is:

1. A luminescent material comprising the fired reaction product of MgO, $SiO_2$, $TiO_2$ and $MgF_2$, the molecular ratio of MgO to $SiO_2+TiO_2$ lying between the limits 4:1 and 1:2; the molecular ratio of $SiO_2$ to $TiO_2$ lying between the limits 200:1 and 1:1 and the molecular ratio of MgO to $MgF_2$ lying between the limits 10:1 and 1:2.

2. A luminescent material as claimed in claim 1, and which includes in its composition an element of the group consisting of Hg, Mn, Sb, Sn, Te and Tl introduced by adding, prior to the reaction, from 0.55% to 6%, by weight of the other ingredients, of a compound of the element which will break down under the influence of the firing and in the presence of the other ingredients into such a state as to allow its incorporation in, or influence on, the crystal matrix of the material.

3. The method of preparing a luminescent material as claimed in claim 1, which consists in intimately mixing the desired proportions of the selected raw materials, and then firing the mixture in an oxidizing atmosphere at a temperature of between 1050° C. and 1200° C. until the desired luminescence is obtained.

4. The method of preparing a luminescent material as claimed in claim 2, which consists in intimately mixing the desired proportions of the selected raw materials, and then firing the mixture in an oxidizing atmosphere at a temperature of between 1050° C. and 1200° C. until the desired luminescence is obtained.

5. A luminescent material comprising the fired reaction product, in parts by weight, of about 43 parts MgO, 5 parts $TiO_2$, 33.8 parts $SiO_2$ containing 14% moisture, and 10 parts $MgF_2$.

6. A luminescent material comprising the fired reaction product, in parts by weight, of about 43 parts MgO, 10 parts $TiO_2$, 30 parts $SiO_2$ containing 14% moisture, 10 parts $MgF_2$ and 4.5 parts $HgNO_3.H_2O$.

7. A luminescent material comprising the fired reaction product, in parts by weight, of about 34.5 parts MgO, 20 parts $TiO_2$, 30 parts $SiO_2$ containing 14% moisture, 10 parts $MgF_2$ and 1.5 parts $Mn(NO_3)_2.6H_2O$.

References Cited in the file of this patent

UNITED STATES PATENTS

| Number | Name | Date |
|---|---|---|
| 2,473,960 | Kroger | June 21, 1949 |
| 2,479,158 | Froelich | Aug. 16, 1949 |
| 2,491,865 | Kroger | Dec. 20, 1949 |
| 2,511,572 | Ellefson | June 13, 1950 |
| 2,532,774 | Kroger | Dec. 5, 1950 |